United States Patent [19]
Paoli

[11] 3,917,180
[45] Nov. 4, 1975

[54] MECHANICAL SEPARATOR MACHINE ROTOR AND METHOD OF MAKING SAME

[76] Inventor: Stephen A. Paoli, 520 Sixth St., Rockford, Ill. 61108

[22] Filed: July 5, 1974

[21] Appl. No.: 486,172

Related U.S. Application Data

[62] Division of Ser. No. 297,634, Oct. 16, 1972, Pat. No. 3,857,518.

[52] U.S. Cl.............. 241/293; 29/156.8 R; 241/68; 241/93
[51] Int. Cl.² ........................................ B02C 19/22
[58] Field of Search...................... 241/68, 93, 293; 29/156.8 R

[56] References Cited
UNITED STATES PATENTS

| | | |
|---|---|---|
| 3,266,542 | 8/1966 | Paoli .................................... 241/68 |
| 3,524,487 | 8/1970 | Paoli .................................... 241/68 |
| 3,552,461 | 1/1971 | Paoli .................................... 241/68 |

Primary Examiner—Roy Lake
Assistant Examiner—E. F. Desmond
Attorney, Agent, or Firm—Wolfe, Hubbard, Leydig, Voit & Osann, Ltd.

[57] ABSTRACT

A rotor and method of making same adapted for use in an improved mechanical separator machine for processing large chunks of lower grade meat containing tough parts such as sinew, cartilage, and stringy connective tissue. The machine separates the lean meat from the tougher tissues, delivering lean meat having the consistency of high grade coarse ground hamburger, and ejecting the separated tougher tissues as waste.

4 Claims, 5 Drawing Figures

MECHANICAL SEPARATOR MACHINE ROTOR AND METHOD OF MAKING SAME

This is a division, of application Ser. No. 297,634 filed Oct. 16, 1972, now U.S. Pat. No. 3,857,518, issued Dec. 31, 1974.

DESCRIPTION OF THE INVENTION

The present invention relates in general to food processing machinery and, more specifically, to a rotor and method of making same for use in an improved mechanical separator machine. The machine is adapted to receive and process large chunks of lower grade meat containing tough parts such as sinew, cartilage, and stringy connective tissue. The machine, upon receiving this material and, is adapted to separate mechanically the lean meat from the tougher tissues, delivering the lean meat with the consistency of high grade coarse ground hamburger, and ejecting the tougher tissues as waste.

The present invention represents an improvement over the ones disclosed and claimed in my prior U.S. Pat. No. 3,266,542 issued Aug. 16, 1966, U.S. Pat. No. 3,524,487 issued Aug. 18, 1970, and No. 3,659,638 issued May 2, 1972. This application is a division of my prior application Ser. No. 297,634, filed Oct. 16, 1972, now U.S. Pat. No. 3,857,518.

In conventional packing house operations, large quantities of low grade meat are produced. The low grading on much of this meat is due to the fact that these cuts of meat contain large amounts of undesirable tissue such as sinew, cartilage and stringy connective tissue along with the lean meat. In beef carcasses, for example, most of the hind leg cuts are of this low grade type. As a result, these cuts of meat are ground up and used in foods other than premium meat products.

One object of the present invention is to provide a rotor and method of making same for use in a machine adapted to separate mechanically low grade cuts of meat containing substantial amounts of tough, undesirable tissues into high grade lean meat usuable in premium meat products, and ejecting the undesirable tissues as waste.

Another object is to provide a rotor for a machine of the foregoing type adapted to accept, as raw material, chunks of low grade meat on the order of a few ounces to two or three pounds, to separate the lean meat from the tougher tissues, to deliver the lean meat having the consistency of coarse gound hamburger, and to eject the tougher tissues as waste.

A further object is to provide a rotor for a mechanical separator machine of the character set forth and adapted to produce coarse ground lean meat from low quality cuts with no temperature rise, or a negligible temperature rise, in the end product.

Still another object is to provide a rotor for a machine of the foregoing type which may be quickly assembled and disassembled for cleaning and maintenance, and which will meet the high standards almost universally required of food processing machinery.

Other objects and advantages will become apparent from the following description, taken together with the accompanying drawings, in which.

Figure 2:
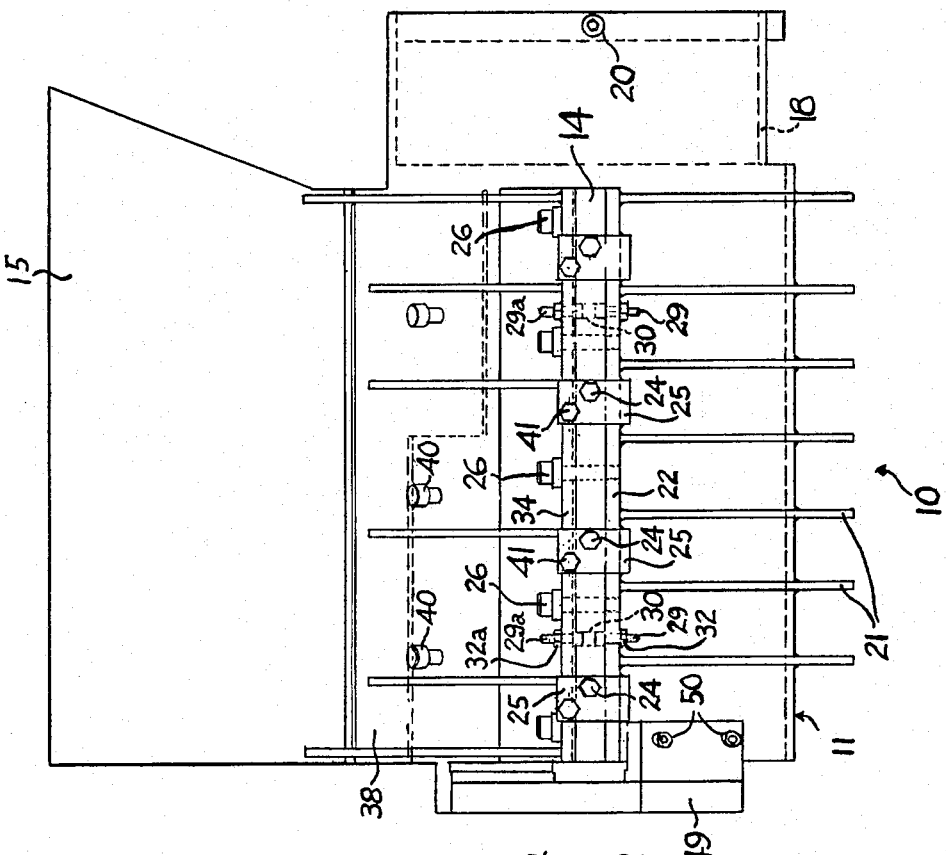
FIG. 2 is a side elevational view of the illustrative machine of FIG. 1.

While the invention is susceptible of various modifications and alternative constructions, a certain illustrative embodiment has been shown in the drawings and will be described below in considerable detail. It should be understood, however, that there is no intention to limit the invention to the specific form disclosed but, on the contrary, the intention is to cover all modifications, alternative constructions, and equivalents falling within the scope of the appended claims.

Figure 1:
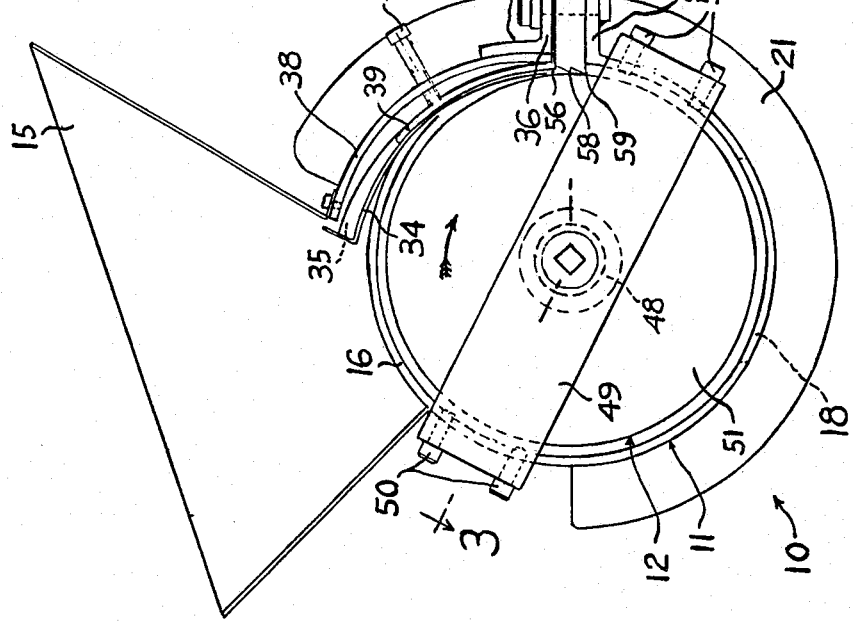
FIG. 1 is an end view of an illustrative machine embodying the present invention.

Referring more specifically to FIGS. 1 and 2, the invention is there examplified in an illustrative mechanical separator machine 10. The machine 10 is somewhat similar in organization to the deboning machines disclosed in my prior U.S. Pat. Nos. 3,266,542, 3,524,487, and 3,659,638, supra, although its function in this case is not deboning. The machine 10 comprises a generally cylindrical casing 11 containing a power driven rotor 12 and a cooperating pressure bar 14. Raw material in the form of chunks of low grade meat is fed into the machine via hopper 15 and feed opening 16 in the top of the casing. It is thereupon separated into high quality lean meat and waste. The lean meat, which has the consistency of coarse ground hamburger, passes into the rotor and out via an aperture 18 in the casing near the driven end of the rotor. The undesirable waste tissues comprising sinew, cartilage, and stringy connective tissue, are trapped on the outer periphery of the rotor and discharged adjacent the outboard end thereof.

Figure 3:
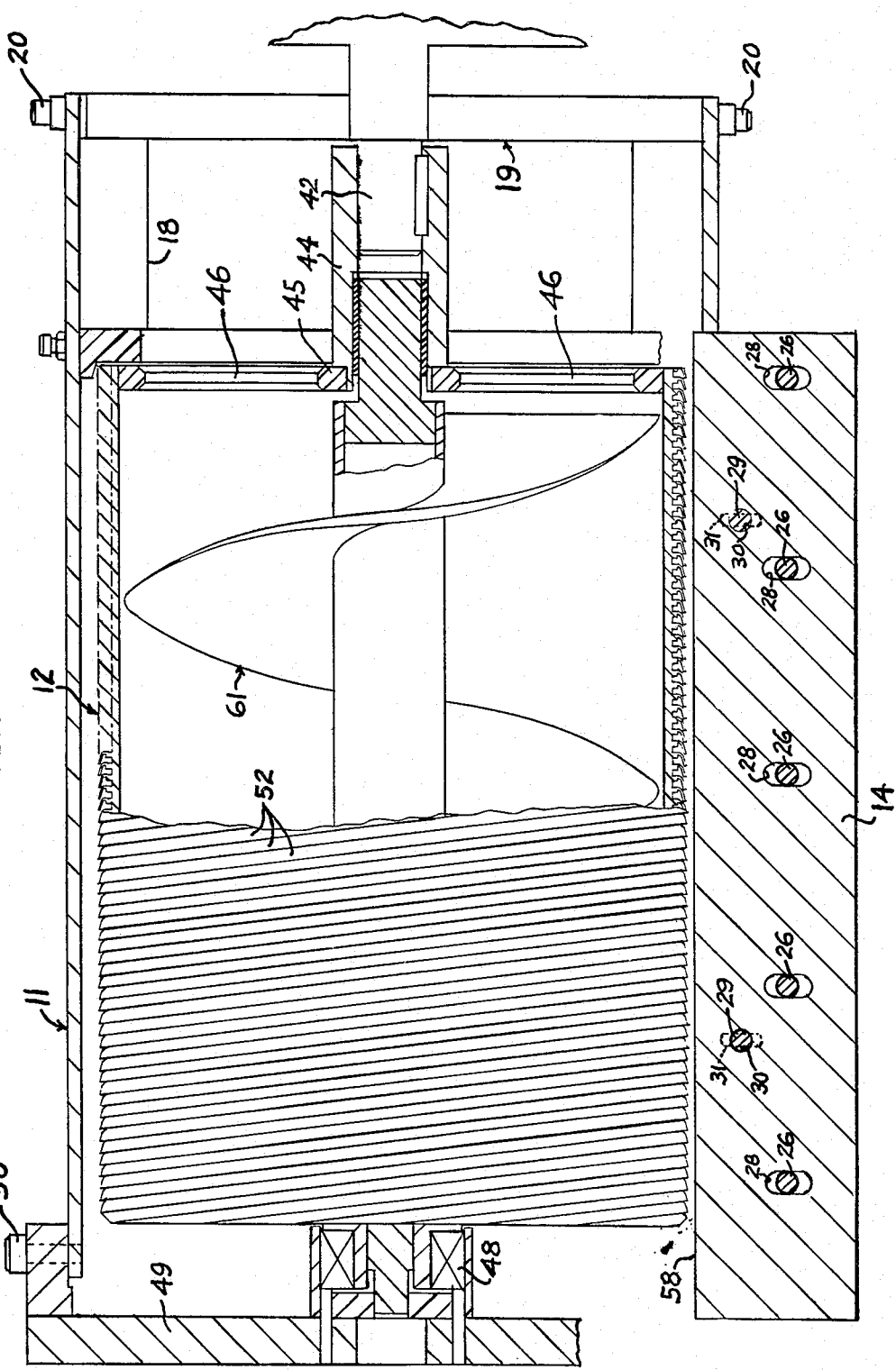
FIG. 3 is an enlarged, fragmentary horizontal sectional view of the rotor of the machine of FIG. 1, taken in the plane of the line 3—3.
Figure 4:
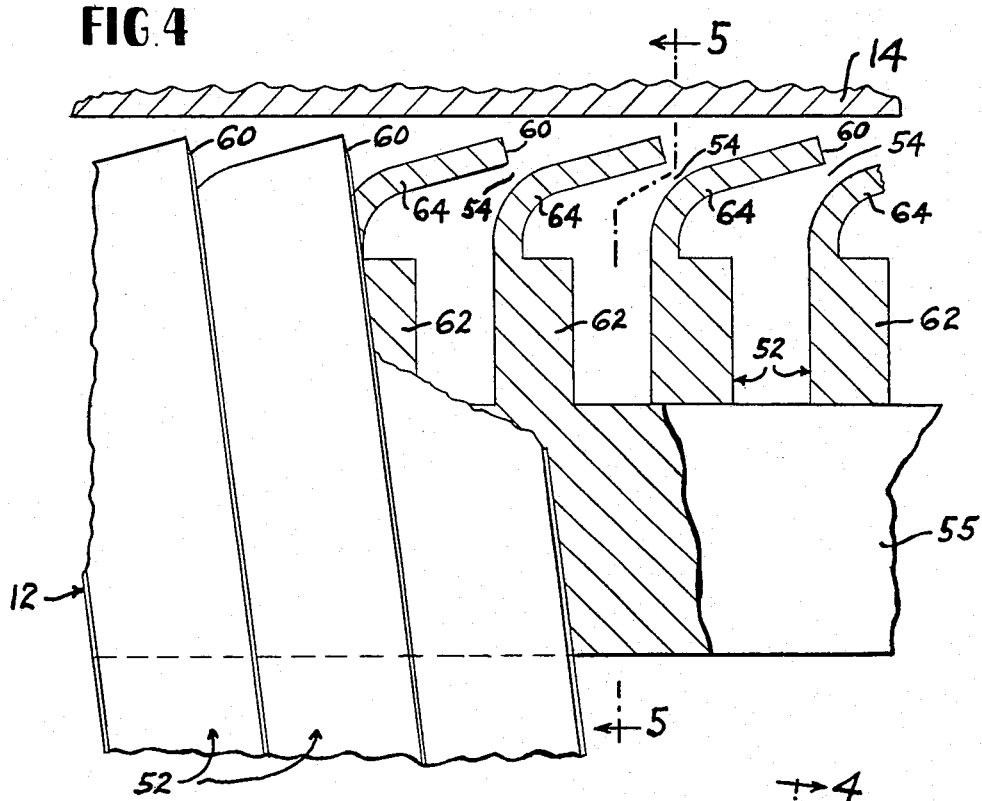
FIG. 4 is a further enlarged fragmentary sectional view, partly in elevation, detailing a portion of the rotor of the illustrative machine and taken in the plane of the line 4—4 in FIG. 5.

The casing 11 (FIGS. 1–3) has in this instance a generally cylindrical tubular configuration and is mounted cantilever fashion on the drive unit 19. It is secured to the latter as by means of cap screws 20. Longitudinally spaced arcuate stiffener ribs 21 reinforce the casing against deflection due, for example, to concentrations of lateral thrust in the vicinity of the pressure bar.

The pressure bar 14 (FIGS. 1–3) is mounted on a base flange 22 which turns outwardly from the casing wall. The flange 22 is situated so that the pressure bar 14 will be disposed with its medial plane in or near coincidence with the horizontal axial plane of the rotor 12. The pressure bar 14 may be adjusted for clearance with the rotor as by means of adjusting screws 24 mounted in brackets 25 fixed to the base flange. The pressure bar is secured in adjusted position as by means of hold-down bolts 26 which pass through clearance slots 28 in the bar and engage tapped holes in the base flange.

To permit the pressure bar to be returned to its precise adjusted position repeatedly after disassembly of the machine for cleaning, the pressure bar is provided with a pair of dowel pins 29 which snugly engage corresponding holes 30 in the bar. Each dowel pin is formed with a threaded shank of reduced diameter which fits in an initial adjustment slot 31 in the base flange. Clamp nuts 32 on the dowel pins are loosened during initial adjustment of the pressure bar. Once the adjusted position of the pressure bar has been determined by use of the screws 24, the clamp nuts 32 are tightened, fixing the position of the dowels 29 on the base flange and making it possible to return the pressure bar repeatedly to the same precise position after disassembly.

The machine 10 is equipped with a regulator plate assembly (FIG. 1) adapted to control the feeding of raw material to the rotor 12 and pressure bar 14. This assembly is generally similar to the one disclosed in my prior U.S. Pat. No. 3,552,461, supra, to which reference may be made for further details. It will suffice for present purposes to note that this assembly comprises a regulator plate 34 of concave form which extends from the pressure bar 14 and diverges outwardly and upwardly toward the feed opening 16 at the base of the hopper. The plate 34 includes an arcuate pocket 35 adjacent the driven end of the rotor, providing additional clearance for receiving the chunks of raw material from the hopper. The regulator plate 34 is clamped between mounting flange 36 of an arcuate segment of the casing wall 38 and the top of the pressure bar 14. The plate 34 is reinforced by a backup plate 39 which, in turn, may be adjusted by screws 40 in the casing wall 38. The clearance between the regulator plate 34 and the rotor 12 may be varied by means of adjusting screws 41 carried by the brackets 25. The plate 34 and casing wall 38 may be retained in place by means of the hold-down bolts 26.

To permit the regulator plate 34 to be returned to its adjusted position repeatedly after disassembly of the machine, resort is had to dowels 29a which, like the dowels 29, snugly engage the holes 30 in the pressure bar. The dowels 29a are provided with threaded shanks of reduced diameter which engage clearance slots in the mounting flange 36 similar to the slots 31. Once the precise adjustment of the regulator plate is effected, clamp nuts 32a of the dowels 29a are tightened, thereby referencing the position of the regulator plate 34 to the precisely adjusted position of the pressure bar.

As noted earlier herein, the rotor 12 is journaled in the casing 11 (FIGS. 1 and 3) and is power driven from output shaft 42 of the drive unit 19 which may, for example, be a motor driven reduction gear. The inboard end of the rotor adjacent the drive unit 19 is supported by means of hub 44 and end plate 45, the latter having a plurality of large meat discharge apertures 46. The outboard end of the rotor is journaled in a main support bearing 48 mounted on a diametrical bracket 49 which extends across the end of the casing. The bracket 49 is detachably secured to the casing 11 as by means of cap screws 50. The outer end of the rotor 12 is centered in the bearing 48 and closed by means of a solid end plate 51.

Provision is made in the machine 10 for accepting as raw material chunks of low grade meat containing sinew, gristle and stringy connective tissue, extracting the lean meat, and ejecting the undesirable tissue as waste. This is accomplished by fashioning the rotor 12 with a plurality of helical cutting elements 52 disposed in axially spaced nested overlapping relation on the periphery of the rotor, and by using such rotor with an appropriate pressure means. The helical cutting elements 52 define initially constricted helical passages 54 which may, for example, be on the order of 0.030 inch at the throat, opening generally axially of the rotor and communicating with the interior thereof. The cutting elements 52 are unitary with a plurality of longitudinally extending circumferentially spaced lands 55 in the rotor and the communication from the passages 54 to the rotor interior is via the spaces between these lands.

Figure 5:
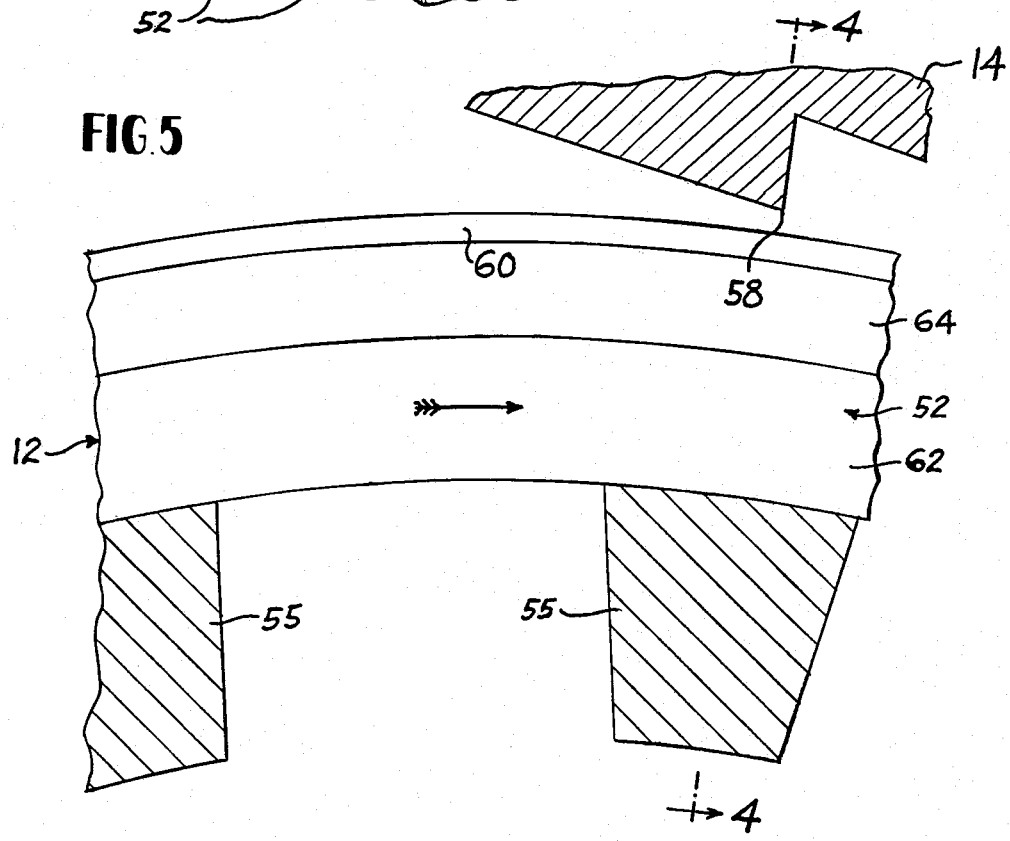
FIG. 5 is an enlarged fragmentary transverse sectional view taken in the plane of the line 5—5 in FIG. 4.

The pressure means cooperating with the cutting elements 52 of the rotor 12 comprises the pressure bar 14 and regulator plate 34. The lower portion of the regulator plate 34 closest to the pressure bar 14 has an apex 56 which may have a clearance with the rotor approximately equal to or slightly greater than that of the pressure bar. The latter, in this instance, is of the double pocket type and includes two apexes 58, 59 which may, for example, be set for a rotor clearance on the order of 0.030 inch. Upon rotation of the rotor in a clockwise direction (as viewed in FIGS. 1 and 5) the raw material is spread out on the corrugated peripheral surface of the rotor 12 by the regulator plate. With further rotation of the rotor, the raw material is repeatedly squeezed between the periphery of the rotor and the respective apexes 56, 58 and 59 of the regulator plate and the pressure bar. The lean meat, being slightly fibrous but quite plastic, is thereby cut and extruded axially of the rotor through the initially constricted passages 54 between the overlapping cutting elements 52, thence passing into the interior of the rotor 12. The stringy and cartilaginous tissues are trapped on the outer periphery of the rotor and pushed along the pressure bar 14 toward the outboard end of the rotor by the leading edges 60 of the overlapping cutting elements. The waste tissues are thus discharged to a collecting means at the outboard end of the rotor and pressure bar.

The lean meat which enters the rotor 12 is extracted therefrom by means of the fixed auger 61 (FIG. 3) which is held against rotation as by means of a square socket in the bracket 49. The auger 61 guides the incoming lean meat to the discharge apertures 46 at the inboard end of the rotor. From here it drops down through the casing discharge aperture 18 to an appropriate collecting means. The action of the machine on the lean meat is such that it still retains its slightly fibrous properties and has the consistency of high grade coarse gound hamburger.

Another aspect of the invention involves the manufacture of the rotor 12. Starting with a piece of heavy tubular stock, the first step is to define the circumferentially spaced lands 55 on the interior of the tube. The helical cutting elements 52 are then defined by a thread cutting operation which cuts through to the spaces between the lands 55. Each such element 52 is formed with a base portion 62 and the elements are spaced apart axially approximately the width of their base portions. the next step involves forming an upstanding relieved portion 64 of somewhat lesser width, in this instance two-thirds less, than the width of the base portion 62. The upstanding relieved portions are then bent axially into overlapping spaced relation with their respective adjacent cutting elements. In this instance, it has been found satisfactory to set this spacing at approximately 0.030 inch. This gives the cutting elements a concave, convex cross section, with the leading edges 60 all facing the outboard end of the rotor.

The pitch and number of the helical cutting elements 52 may be varied somewhat without departing from the present invention. For example, satisfactory results have been achieved in rotor approximately 12 inches in diameter driven at 125 R.P.M., utilizing 16 cutting elements each having a pitch of 1 turn in 4 inches of rotor length. Satisfactory results have also been achieved in a similar rotor utilizing 32 cutting elements each having a pitch of 1 turn in 8 inches.

The machine 10 as described above is capable of processing raw material to produce high grade lean meat at commercially feasible production rates. It is adapted to serve not only as a mechanical separator but also as an excellent meat grinding device of high capacity.

I claim as my invention:

1. In a machine for mechanically separating high grade lean meat in coarse ground form from low grade meat containing sinew, cartilage, and stringy connective tissue, a hollow rotor comprising, in combination:
   a. a plurality of circumferentially spaced, axially extending lands;
   b. a plurality of helical cutting elements each having a base portion unitary with said lands;
   c. said cutting elements being axially spaced on said lands by an amount approximately equal to the width of their base portions;
   d. each said base portion having a projecting relieved portion bent generally axially into overlapping relation with the adjacent cutting element and defining therewith an initially constricted passage communicating with the interior of said rotor;
   e. said bent relieved portion of said cutting elements all extending in the same direction.

2. The combination as set forth in claim 1, wherein the initial constriction of said passage is approximately 0.030 inch.

3. The method of making a hollow rotor for a machine adapted to mechanically separate high grade lean meat in coarse ground form from low grade meat having undesirable tougher tissues, said method comprising the steps of:
   a. forming a plurality of circumferentially spaced axially extending lands;
   b. forming a plurality of helical cutting elements each having a base portion unitary with said lands, said cutting elements being axially spaced an amount approximately equal to the width of their base portions;
   c. forming an upstanding relieved portion unitary with the base portion of each said cutting element, said relieved portion having a height approximately equal to that of said base portion;
   d. and bending the relieved portions of said cutting elements axially in the same direction and into overlapping spaced relation with their respective adjacent cutting elements.

4. The method as set forth in claim 3, wherein the spacing between overlapping relieved portions of said cutting elements is approximately 0.030 inch.

* * * * *